(12) United States Patent (10) Patent No.: US 7,399,917 B2
Nakamura et al. (45) Date of Patent: Jul. 15, 2008

(54) MUSIC CONTENT PLAYBACK APPARATUS, MUSIC CONTENT PLAYBACK METHOD AND STORAGE MEDIUM

(75) Inventors: Takatoshi Nakamura, Kanagawa (JP); Yuichi Abe, Tokyo (JP); Yoichiro Sako, Tokyo (JP); Masamichi Asukai, Kanagawa (JP); Mitsuru Takehara, Tokyo (JP); Katsuya Shirai, Kanagawa (JP); Toru Sasaki, Tokyo (JP); Toshiro Terauchi, Tokyo (JP)

(73) Assignee: Sony Corporation, Tokyo (JP)

( * ) Notice: Subject to any disclaimer, the term of this patent is extended or adjusted under 35 U.S.C. 154(b) by 49 days.

(21) Appl. No.: 11/654,812

(22) Filed: Jan. 18, 2007

(65) Prior Publication Data

US 2007/0208770 A1    Sep. 6, 2007

(30) Foreign Application Priority Data

Jan. 23, 2006  (JP) ............................. 2006-014215

(51) Int. Cl.
*G10H 7/00* (2006.01)

(52) U.S. Cl. ............................. 84/609; 84/600; 84/614; 84/615; 84/649; 84/653; 700/94; 707/7; 707/101; 707/102

(58) Field of Classification Search .................. 84/600, 84/609, 614, 615, 649, 653; 700/94; 707/7, 707/101, 102
See application file for complete search history.

(56) References Cited

U.S. PATENT DOCUMENTS

| 5,321,674 | A | | 6/1994 | Kwon | |
| 5,880,388 | A | * | 3/1999 | Kajiyama et al. | 84/609 |
| 7,179,982 | B2 | * | 2/2007 | Goto | 84/616 |
| 2001/0015121 | A1 | * | 8/2001 | Okamura et al. | 84/609 |
| 2002/0121181 | A1 | * | 9/2002 | Fay et al. | 84/609 |
| 2003/0112467 | A1 | | 6/2003 | McCollum et al. | |
| 2006/0107207 | A1 | * | 5/2006 | Wada | 715/526 |

FOREIGN PATENT DOCUMENTS

| EP | 1742222 A1 | 1/2007 |
| EP | 1780723 A2 | 5/2007 |
| GB | 2266987 A | 11/1993 |
| JP | 2004-356774 | 12/2004 |

OTHER PUBLICATIONS

U.S. Appl. No. 11/654,730, filed Jan. 18, 2007, Takatoshi Nakamura et al.

* cited by examiner

*Primary Examiner*—George Nguyen
*Assistant Examiner*—Kawing Chan
(74) *Attorney, Agent, or Firm*—Wolf, Greenfield & Sacks, P.C.

(57) ABSTRACT

A music content playback apparatus includes: a selection section that selects a piece of music content out of a plurality of pieces of music content; a recognition section that recognizes playback elapse state about a previous piece of music content played immediately before the piece of music content is selected; and a playback section that plays back the selected piece of music content from a playback point corresponding to the playback elapse state.

8 Claims, 19 Drawing Sheets

TBL1 CONTENT DATA MANAGEMENT TABLE

| CONTENT ID | CONTENT NAME |
|---|---|
| 0001 | Music_server/music1.mp3 |
| 0002 | Music_server2/music2.mp3 |
| 1001 | My_photo1.jpg |
| 1002 | Jacket_server/jacket11.jpg |
| ... | ... |

FIG.4A

TBL2 CONTENT METADATA MANAGEMENT TABLE

| CONTENT ID | CONTENT METADATA NAME |
|---|---|
| 0001 | Music_server/music1_meta.mta |
| 0002 | Music_server2/music2_meta.mta |
| 1001 | My_photo1_meta.mta |
| 1002 | Jacket_server2/jacket11_meta.mta |
| ... | ... |

FIG.4B

FIG.8A SELECTION CONTENT

FIG.8B PLAYBACK TIMING OF CONTENT

PLAYBACK VOLUME LEVEL ON LEFT CHANNEL

PLAYBACK VOLUME RIGHT ON LEFT CHANNEL

FIG.15A VOLUME LEVEL
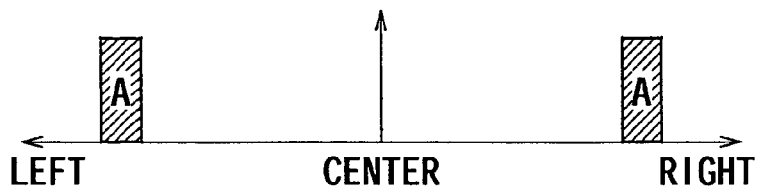
FIG.15B SOUND IMAGE LOCALIZATION
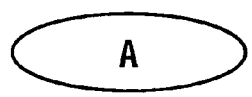
FIG.16A VOLUME LEVEL
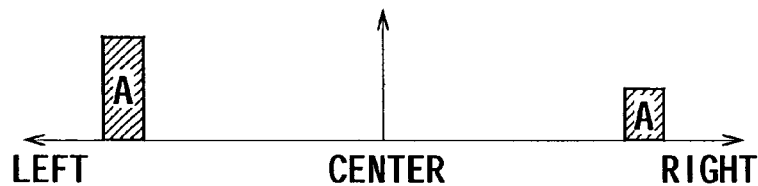
FIG.16B SOUND IMAGE LOCALIZATION
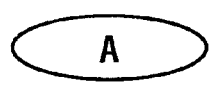
FIG.17A VOLUME LEVEL
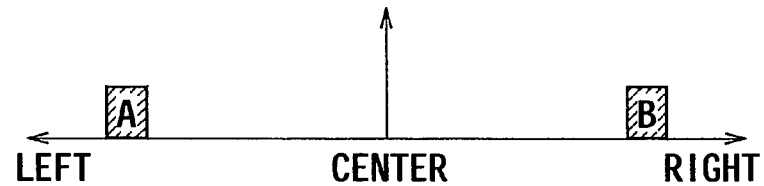
FIG.17B SOUND IMAGE LOCALIZATION
 

VOLUME LEVEL

SOUND IMAGE LOCALIZATION

VOLUME LEVEL

SOUND IMAGE LOCALIZATION

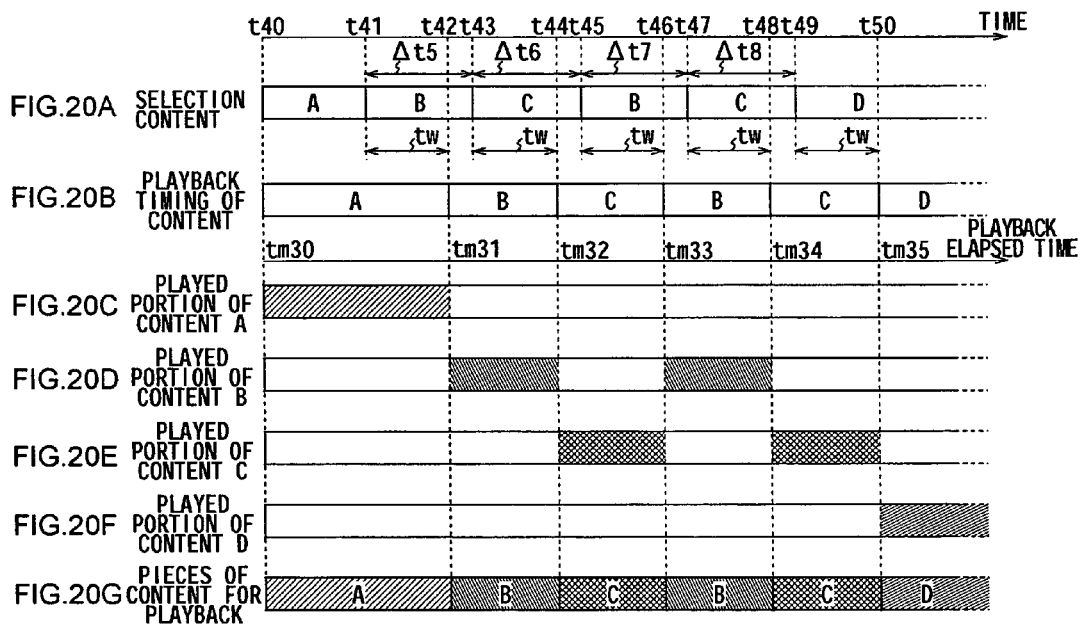

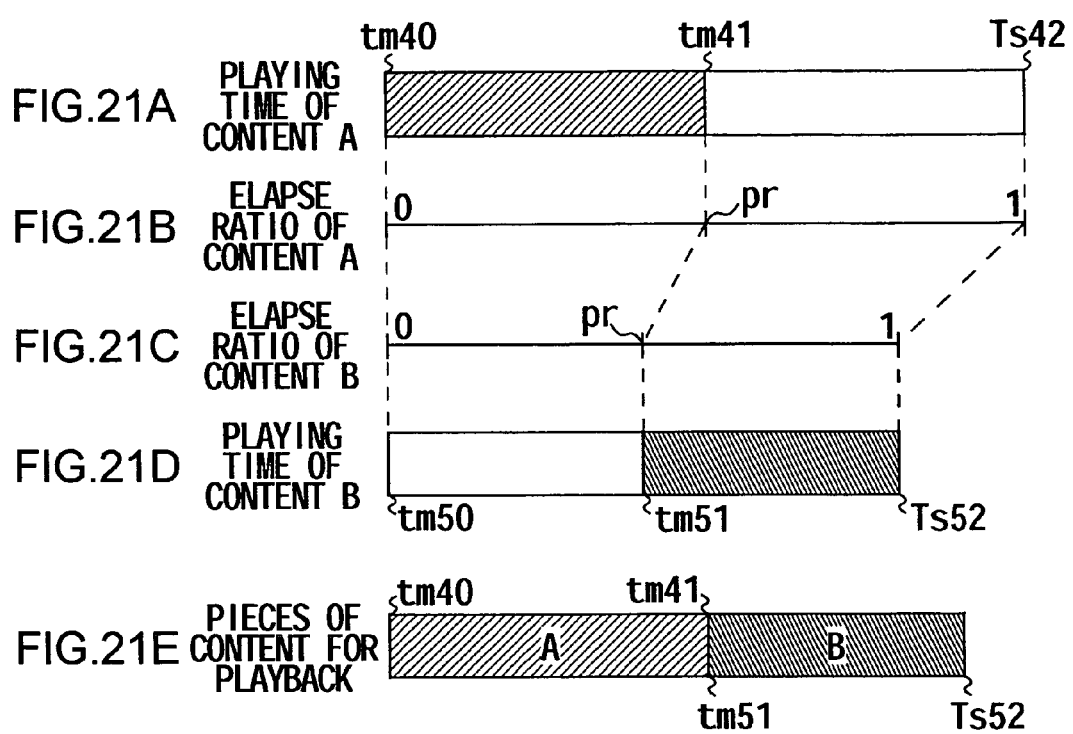

MUSIC CONTENT PLAYBACK APPARATUS, MUSIC CONTENT PLAYBACK METHOD AND STORAGE MEDIUM

CROSS REFERENCES TO RELATED APPLICATIONS

The present invention contains subject matter related to Japanese Patent Application JP2006-014215 filed in the Japanese Patent Office on Jan. 23, 2006, the entire contents of which being incorporated herein by reference.

BACKGROUND OF THE INVENTION

1. Field of the Invention

The present invention relates to a music content playback apparatus, music content playback method and storage medium for storing a music content playback program, and is preferably applied to a case in which a user interface is provided to retrieve the user's desired piece of music content out of many pieces of music content, for example.

2. Description of Related Art

In recent years, a content playback device is here to stay: the content playback device stores many pieces of digital content, such as music and video, in a large-capacity hard disk and the like; the content playback device is also capable of acquiring the digital content from external servers through a high-speed network and the like; the content playback device plays back the piece of digital content specified by a user.

For example, Jpn. Pat. Laid-open Publication No. 2004-356774 discloses a content playback device which displays rows of thumbnails each of which is associated with each piece of content after classifying them by content (media) type. This allows a user to easily select pieces of content.

SUMMARY OF THE INVENTION

By the way, there is a content playback device, which stores many pieces of music content, capable of immediately playing back the piece of music content selected through a cursor by a user for trial listening. This helps the user to realize what the pieces of music content are about when he/she selects one to play back.

Generally, when the user switches what the content playback device plays to his/her desired piece of music content, this content play back device plays back it from its top part. This can be monotonous and boring to the user who is listening to that piece of music content.

If the content playback device can play back the piece of music content from other parts, this can be fresh and enjoyable to the user who is listening to it, and therefore that can entertain the user.

The present invention has been made in view of the above points and is intended to provide a music content playback apparatus, music content playback method and storage medium for storing a music content playback program that can entertain the user while changing the piece of music content.

In one aspect of the present invention, a music content playback apparatus performs the process of: selecting a piece of music content out of a plurality of pieces of music content; recognizing playback elapse state about a previous piece of music content played immediately before the piece of music content is selected; and playing back the selected piece of music content from a playback point corresponding to the playback elapse state.

In this manner, the music content playback apparatus recognizes, when the piece of music content is selected, the playback elapse state of the previous piece of music content so that the selected piece of music content takes over it. This allows the music content playback apparatus to play back the selected piece of music content from various playback points, not from the top part.

According to one aspect of the present invention, the music content playback apparatus recognizes, when the piece of music content is selected, the playback elapse state of the previous piece of music content so that the selected piece of music content takes over it. This allows the music content playback apparatus to play back the selected piece of music content from various playback points, not from the top part. Thus, the music content playback apparatus, the music content playback method and the storage medium for storing a music content playback program can entertain the user while changing the piece of music content.

The nature, principle and utility of the invention will become more apparent from the following detailed description when read in conjunction with the accompanying drawings in which like parts are designate by like reference numerals or characters.

BRIEF DESCRIPTION OF THE DRAWINGS

In the accompanying drawings:

FIGS. 4A and 4B are schematic diagrams illustrating the configuration of a data management table;

FIGS. 15A and 15B are schematic diagrams illustrating volume levels and sound localization at time instance t31;

FIGS. 16A and 16B are schematic diagrams illustrating volume levels and sound localization at time instance t32;

FIGS. 17A and 17B are schematic diagrams illustrating volume levels and sound localization at time instance t34;

FIGS. 20A to 20G are schematic diagrams illustrating playback of content during low-speed selection;

FIGS. 21A to 21E are schematic diagrams illustrating playback of content according to a second embodiment of the present invention.

DETAILED DESCRIPTION OF PREFERRED EMBODIMENTS

An embodiment of the present invention will be described in detail with reference to the accompanying drawings.

(1) First Embodiment

(1-1) Overall Configuration of Audio Device

Figure 1:
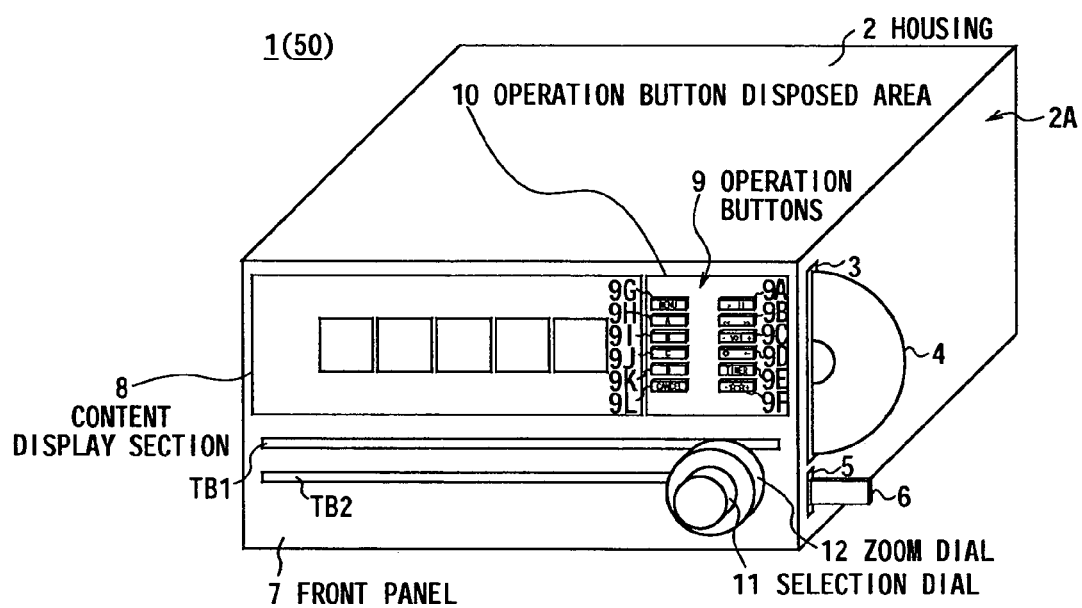
FIG. 1 is a schematic perspective view of an audio device.

In FIG. 1, the reference numeral 1 denotes an audio device according to an first embodiment of the present invention. An insertion slot 3 is placed on a right side panel 2A of a housing 2. The insertion slot 3 accepts an optical disc 4 such as Digital Versatile Disc (DVD) and Compact Disc (CD). An entry slot 5 is placed below the insertion slot 3. The entry slot 5 accepts a small memory card 6 such as "MEMORY STICK (Registered Trademark of Sony Corporation)".

The audio device 1 also includes the following components: a content display section 8, such as liquid crystal display, on a front panel 7; an operation button disposed area 10 on the right of the content display section 8; and a zoom dial 12 with a selection dial 11 on the bottom right of the content display section 8 and the operation button disposed area 10. The zoom dial 12, which is larger than the selection dial 11, is placed under the selection dial 11 that is to be used to select a piece of music content.

In addition, the audio device 1 includes time axis bar display sections TB1 and TB2 (described below) to present pieces of music content in chronologic order, or in order of time. The time axis bar display sections TB1 and TB2 are for example equivalent to a liquid crystal display, being placed below the content display section 8 and the operation button disposed area 10.

The audio device 1 is capable of playing back the piece of music content from the optical disc 4 in the insertion slot 3 and from the small memory card 6 in the entry slot 5 to output music through a speaker (not shown) connected to the audio device 1. In addition, the audio device 1 is capable of reading out the pieces of music content from the optical disc 4 and the small memory card 6 to store them in an internal Hard Disk Drive.

Furthermore, the audio device 1 is capable of connecting to the Internet through a network cable. This allows the audio device 1 to download the desired piece of music content from external servers on the Internet and then store it in the internal Hard Disk Drive.

The operation button disposed area 10 includes a group of operation buttons 9: a playback button 9A, which is to be used to play back or stop the piece of music data selected by the selection dial 11; a skip button 9B, which is used to skip the piece of music content; a volume control button 9C; a recording button 9D; a timer setting button 9E; a user rating button 9F; a menu button 9G, which is used to switch modes; optional buttons 9H to 9K, to which various functions may be assigned according to the modes; and a cancel button 9L. The audio device 1 performs various processes in accordance with the user's operation of the operation buttons 9.

(1-2) Internal Configuration of Audio Device

(1-2-1) Circuit Configuration

Figure 2:
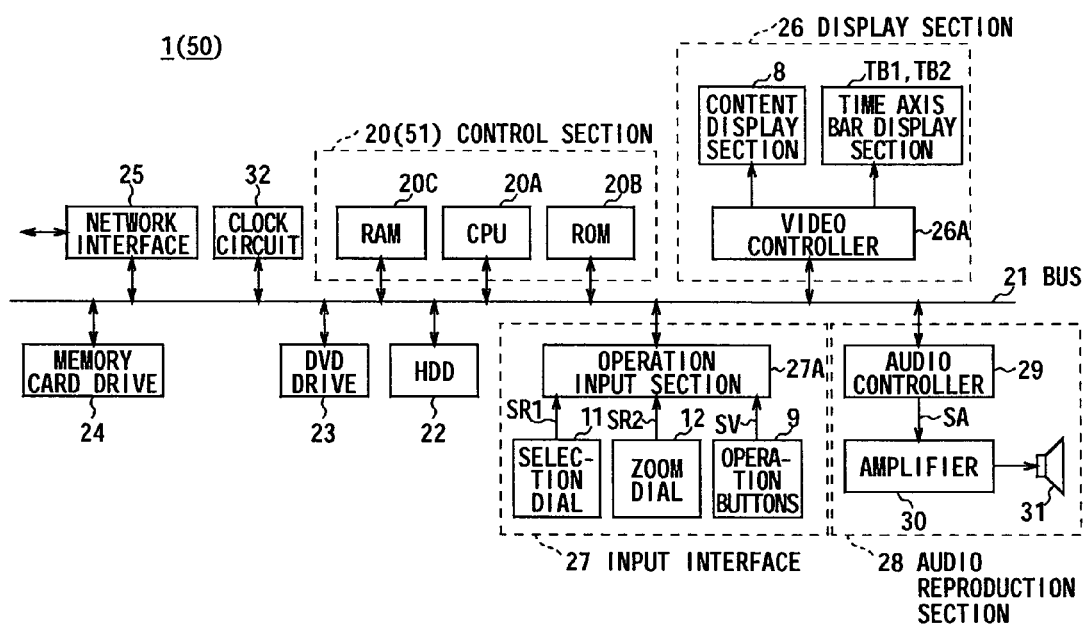
FIG. 2 is a schematic block diagram illustrating the circuit configuration of the audio device.

As shown in FIG. 2, a control section 20 takes overall control of the audio device 1. In the control section 20, a Central Processing Unit (CPU) 20A reads out programs, such as basic programs and content display programs, from a Read Only Memory (ROM) 20B through a bus 21, and then loads them onto a Random Access Memory (RAM) 20C to perform processes such as a content display process.

The control section 20 for example rips music data from the optical disc 4 (FIG. 1) that has been inserted into a DVD drive 23 through the insertion slot 3 (FIG. 1). The control section 20 then encodes the music data in the format of MPEG-1 Audio Layer 3 (MP3), Adaptive Transform Acoustic Coding 3 (ATRAC3) or the like to generate the piece of music content MC. Alternatively, the control section 20 directly reads out the piece of music content MC, which has been already encoded, from the small memory card 6 that has been inserted into a memory card drive 24 through the entry slot 5 (FIG. 1). The control section 20 stores the piece of music content MC in a Hard Disk Drive (HDD) 22.

The control section 20 also acquires the music content MC from an external content server (not shown) through a network interface 25, and then stores it in the Hard Disk Drive 22.

In addition to that, the control section 20 acquires, from the external content server and other servers that are connected to the audio device 1 through the Internet, a thumbnail image SG including a jacket photograph of the piece of music content MC, and metadata MTD including music names, artist names, and release date of the piece of music content MC. The control section 20 subsequently reduces the size of the thumbnail image SG in all directions, and then compresses the size of thumbnail image SG in horizontal direction to produce a content icon CA. The control section 20 then stores the content icon CA in the Hard Disk Drive 22 such that it is associated with the piece of music content MC.

By the way, the Hard Disk Drive 22 has enough space to store, for example, thousands to tens of thousands of pieces of music content MC.

A video controller 26A of a display section 26 obtains a display command from the control section 20 via the bus 21. In response to the display command, the video controller 26A displays a plurality of thumbnail images SG of the pieces of music content MC on the content display section 8 of the front panel 7. In addition, the video controller 26A displays the content icon CA on the time axis bar display sections TB1 and TB2, and also updates, in response to the display command, the displayed information.

When a user rotates the selection dial 11 to the right or left (this operation will be also referred to as "selection operation"), a rotary encoder (not shown) of an operation input section 27 in the selection dial 11 generates, in response to the rotated angle (the amount of rotation), a rotation signal SR1, and then supplies the rotation signal SR1 to the control section 20 through an input interface 27A and the bus 21.

In response to that, the control section 20 switches what it focuses to a right- or left-hand thumbnail image SG on the content display section 8. In this manner, the control section 20 changes what it selects from one piece of music content MC to another (described later in detail).

When a user rotates the zoom dial 12 to the right or left (this operation will be also referred to as "zoom change operation"), a rotary encoder (not shown) of the operation input section 27 in the zoom dial 12 generates, in response to the rotated angle (the amount of rotation), a rotation signal SR2, and then supplies the rotation signal SR2 to the control section 20 through the input interface 27A and the bus 21.

In response to that, the control section 20 changes an extraction condition that defines which thumbnail images SG the content display section 8 displays out of the thumbnail images SG of all pieces of the music content MC stored in the Hard Disk Drive 22, and updates the thumbnail images SG on the content display section 8. The control section 20 also updates a display pattern of the content icons CA on the time axis bar display sections TB1 and TB2 (described later in detail).

When the operation buttons 9 are pushed, the operation input section 27 generates a push signal SU, and then supplies the push signal SU to the control section 20 through the input interface 27A and the bus 21. In this case, the control section 20 performs various processes in response to the operation button pushed (i.e. the playback button 9A to the cancel button 9L), such as playback process.

When the playback button 9A of the operation buttons 9 is pushed while any piece of music content MC is not being played back, the control section 20 reads out the piece of music content MC, which is associated with the focused (or selected) thumbnail image SG, from the Hard Disk Drive 22, and then supplies the piece of music content MC to an audio controller 29 of an audio reproduction section 28 via the bus 21.

The audio controller 29 receives the piece of music content MC, which was read from the Hard Disk Drive 22, via the bus 21, and then performs processes in accordance with the encoding format of the music content MC, such as decoding and Digital-to-Analog (D/A) conversion, to produce a reproduced signal SA. The audio controller 29 subsequently amplifies the reproduced signal SA by an amplifier 30, and then supplies it to a speaker 31 which then outputs, based on the reproduced signal, sound.

The control section 20 acquires time information from a clock circuit 32 through the bus 21 to obtain the current time. The control section 20 repeatedly acquires the current times and calculates the differences between them. In this manner, the control section 20 calculates elapsed time between two points in time.

In this manner, the audio device 1 displays the thumbnail image SG of the piece of music content MC stored in the Hard Disk Drive 22 on the content display section 8 and the like, and also updates the information displayed on the content display section 8 and the like in response to the selection operation or zoom change operation of the operation input section 27 about the pieces of music content MC, and then plays back the selected piece of music content MC.

(1-2-2) Functional Configuration

Figure 3:
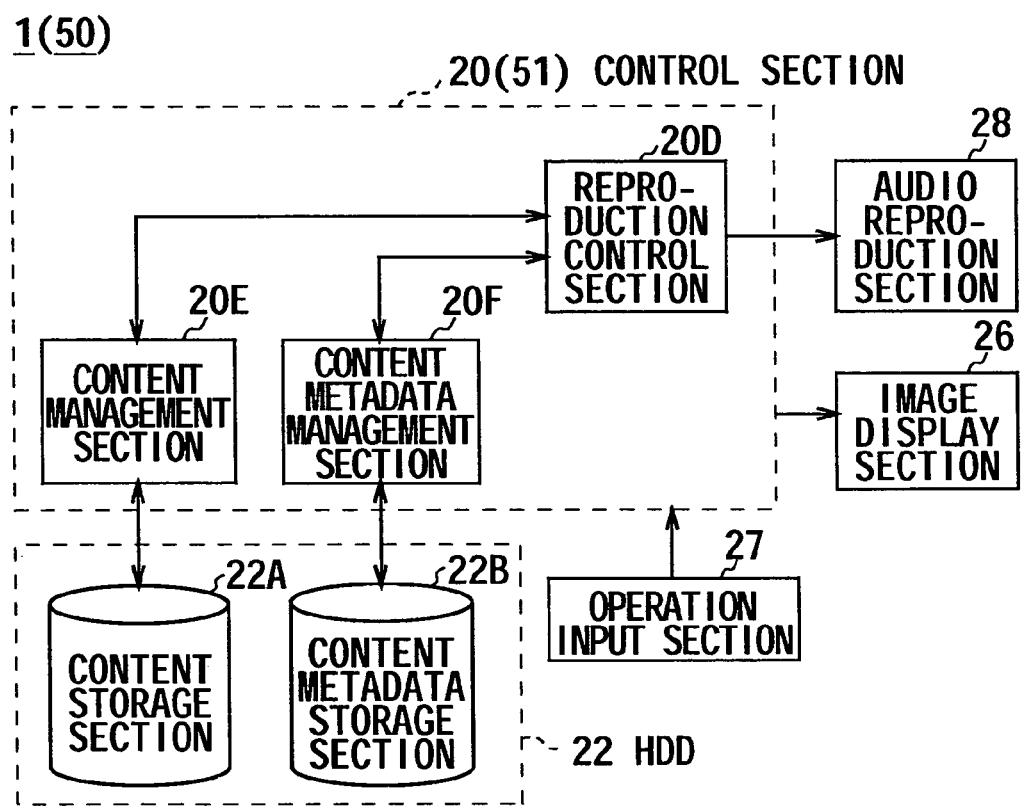
FIG. 3 is a schematic block diagram illustrating the functional configuration of the audio device.

FIG. 3 shows the functional configuration of the audio device 1, detailing the functions of displaying the thumbnail images SG.

The Hard Disk Drive 22 stores the following data in a content storage section 22A: the pieces of music content MC, and the thumbnail images SG and content icons CA corresponding to the pieces of music content MC. The Hard Disk Drive 22 also stores various metadata MTD, such as music names, artist names, release data and annual ranking of the pieces of music content MC, in a content metadata storage section 22B.

The Hard Disk Drive 22 uses a content data management table TBL1 (FIG. 4A) to manage the pieces of music content MC, which are stored in the content storage section 22A, their thumbnail images SG and content icons CA as a file with a predetermined content name indicated by a content ID. FIG. 4B shows a content metadata management table TBL2 that manages various metadata MTD, which are stored in the content metadata storage section 22B, as a file with a content metadata name indicated by a content ID.

When a user performs the selection operation through the selection dial 11 of the operation input section 27 to select a piece of music content MC, a reproduction control section 20D of the control section 20 acquires the metadata MTD of the selected piece of music content MC from the content metadata storage section 22B of the Hard Disk Drive 22 through a content metadata management section 20F. The reproduction control section 20D of the control section 20 also reads out a file (the piece of music content MC) specified by the metadata MTD from the content storage section 22A of the Hard Disk Drive 22 through a content management section 20E, and then supplies the file to the audio reproduction section 28.

In response to that, the audio reproduction section 28 performs processes, such as decoding process and amplification process on the piece of music content MC, to reproduce sound of the piece of music content MC, and then allows the user to listen to it.

In addition, when the user performs the selection operation through the selection dial 11 of the operation input section 27 to switch the piece of music content MC, the reproduction control section 20D of the control section 20 updates the thumbnail images SG displayed on the content display section 8 of the display section 26. In addition, in accordance with the selection operation, the reproduction control section 20D keeps playing the currently played piece of music content MC, or switches what it plays back to the recently selected piece of music content MC (described below in detail).

(1-3) Configuration of Front Panel

The audio device 1 has enough space to store thousands to tens of thousands of pieces of music content MC in its internal Hard Disk Drive 22. The front panel 7 is designed to allow a user to easily retrieve his/her desired piece of music content MC from many pieces of music content MC without using music or artist names.

(1-3-1) All Music Display Mode

Figure 5:
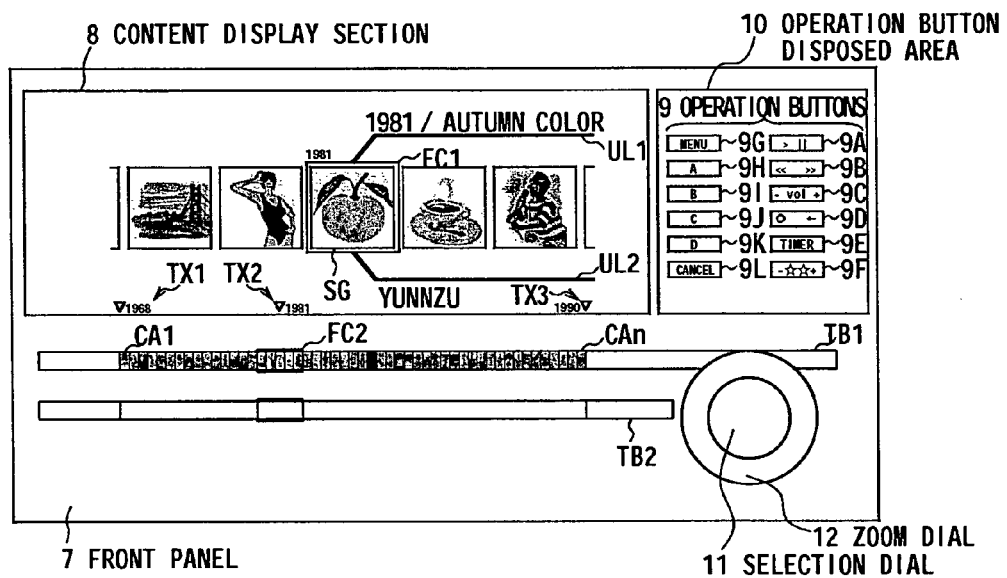
FIG. 5 is a schematic diagram illustrating the information displayed on a front panel in all music display mode.

As shown in FIG. 5, the front panel 7 of the audio device 1 includes the following components: the content display section 8, which displays a plurality of pieces of thumbnail images SG (5 pieces, in this case) each of which includes a jacket photograph and the like of the music content; the time axis bar display section TB1, where the content icons CA1 to CAn corresponding to all pieces of music content MC stored in the Hard Disk Drive 22 are displayed side by side in order of release date (year, month and day of release); and the time axis bar display section TB2, where the content icons CA of the pieces of music content MC that have been culled in a predetermined manner at the time of content retrieval as low-priority data are displayed side by side in order of release date (year, month and day of release).

An all music display mode displays all the content icons CA1 to CAn on the time axis bar display section TB1 in order of release date (year, month and day of release), and does not display any content icons CA on the time axis bar display section TB2.

If the user selects one piece of music content MC by the selection dial 11, then this piece of music content MC is focused by the content display section 8. The content display section 8 visually notifies the user of the fact that the piece of music content MC has been focused by for example putting a red focus frame FC1 on the thumbnail image SG of this piece of music content MC. In addition, the content display section 8 displays its release year and music name ("1981/Autumn color", in this case) on an red underline UL1 extending upward from the focus frame FC1, and its artist name ("YUNNZU", in this case) under an red underline UL2 extending downward from the focus frame FC1.

In this manner, the audio device 1 allows the user to easily recognize the piece of music content MC, which is currently selected by the selection dial 11 through the focus frame FC1 of the content display section 8, by checking the thumbnail image SG, the characters on the underline UL1 and the characters under the underline UL2. The piece of music content MC currently selected by the focus frame FC1 is also referred to as a "piece of selection content SC".

Especially, the audio device 1 can present the piece of music content MC as an image of the thumbnail image SG. Therefore the user who does not remember anything like its music and artist names but its image can easily determine whether this piece of music content is what he/she wants to retrieve. In addition, that reminds him/her that this piece of music content MC is there. Accordingly, this piece of music content MC can be included in his/her retrieval target.

The time axis bar display section TB1 on all music display mode displays the content icons CA1 to CAn in order of release date (year, month and day), or in order of time. In accordance with that, the content display section 8 displays the character strings TX1 to TX3 indicative of the release date of the content icon CA1 to CAn (1968, 1981, and 1990, in this case) on the bottom area of the content display section 8.

In addition, the time axis bar display section TB1 surrounds the five content icons CA, which correspond to the five thumbnail images SG on the content display section 8, with a red focus frame FC2 for example. This allows the user to visually understand, through the focus frame FC2 and the character strings TX1 to TX3 on the content display section 8, where the piece of music content MC selected by the focus frame FC1 is located on the time line.

Figure 6:
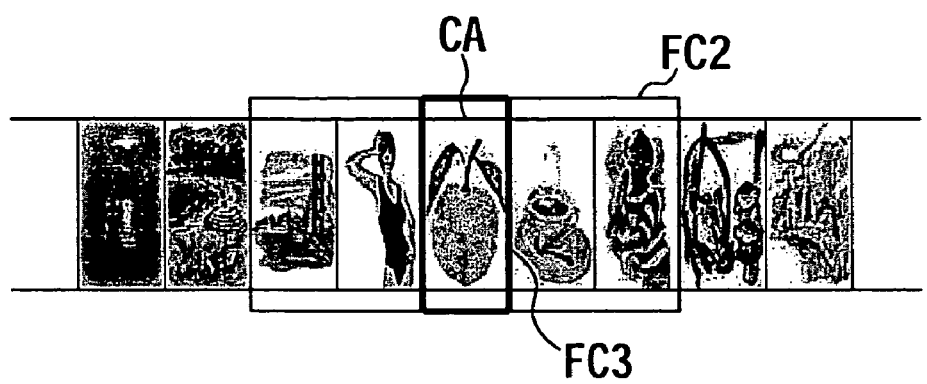
FIG. 6 is a schematic diagram illustrating the configuration of a focus frame.

Especially, as shown in FIG. 6, the time axis bar display section TB1 surrounds the five content icons CA, which correspond to the five thumbnail images SG currently displayed on the content display section 8, with the focus frame FC2. Inside this, the time axis bar display section TB1 furthermore surrounds the content icon CA, which corresponds to the thumbnail image SG that is currently selected by the focus frame FC1 (FIG. 5), with a red focus frame FC3 and also puts yellow on the whole content icon CA to be displayed.

In this manner, the audio device 1 associates the five thumbnail images SG on the content display section 8 with the five content icons CA inside the focus frame FC2 of the time axis bar display section TB1. Accordingly, the user can easily and intuitively understand which generation the pieces of music content MC corresponding to the five thumbnail images SG belong to on the time axis bar display section TB1.

In addition, the audio device 1 plays back, after the thumbnail image SG is selected by the focus frame FC1, the piece of selection content SC. This allows the user to listen to the sound of the piece of selection content SC.

In this manner, the audio device 1 allows the user to check the thumbnail image SG of the piece of music content MC, its release date, and its actual sound to retrieve the piece of music content MC. Accordingly, even if the user does not remember the music name and artist name, he/she can retrieve his/her desired piece of music content MC.

(1-3-2) Selection and Display of Music Content

Figure 7:
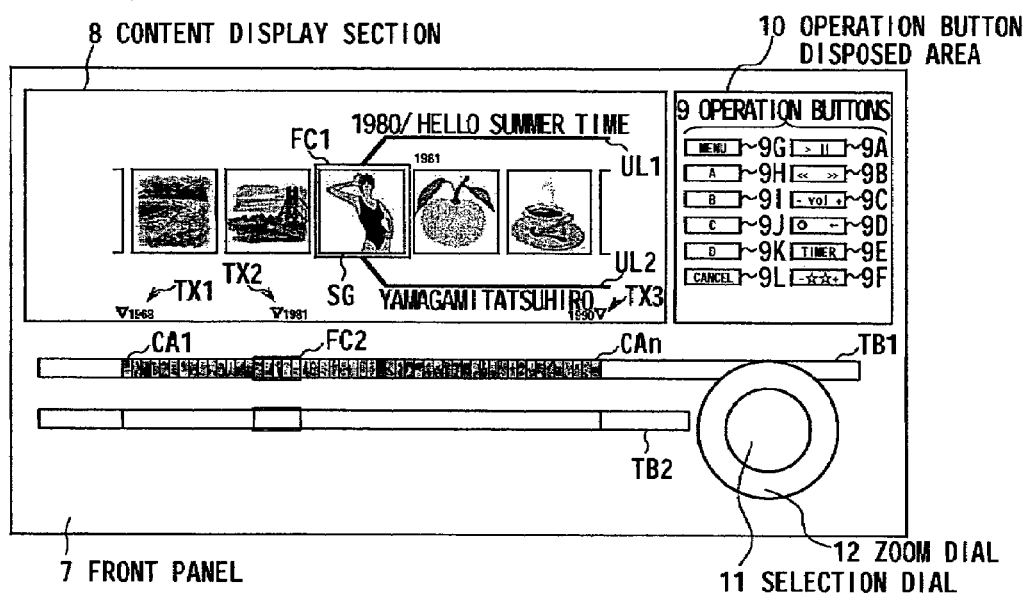
FIG. 7 is a schematic diagram illustrating methods of selecting and displaying the pieces of music content.

As shown in FIG. 7, the control section 20 of the audio device 1 moves the thumbnail images SG on the content display section 8 by one frame each time the selection dial 11 is rotated at its minimum angular increment by the user.

At this time, in response to the rotated direction of the selection dial 11, the control section 20 of the audio device 1 displays an animation where the thumbnail images SG on the content display section 8 are updated by moving to the right or left. In this manner, the thumbnail images SG are scrolled (described in detail below).

In this manner, the control section 20 of the audio device 1 changes what the focus frame FC1 is selecting on the content display section 8 to a next thumbnail image SG. In response to that, the control section 20 moves the focus frame FC2 surrounding the five content icons CA by one frame.

At this time, the control section 20 of the audio device 1 displays the release date and music name of the piece of music content MC (i.e. the piece of selection content SC) corresponding to the thumbnail image SG selected by the focus frame FC1 ("1980/Hello Summer Time", in this case) on the underline UL1, and its artist name ("YAMAGAMI TATSUHIRO", in this case) under the underline UL2.

By the way, when the user operates the selection dial 11 to select a different piece of selection content SC, the control section 20 of the audio device 1 plays back this piece of selection content SC. This allows the user to listen to sound of this piece of selection content SC (described in detail below).

Accordingly, the control section 20 of the audio device 1 can output sound of the selection content SC in response to the user's dial operation of the selection dial 11. In this manner, the control section 20 can provide the user with the sound of the piece of music content MC when he/she retrieves his/her desired piece of music content MC.

(1-4) Play a Different Piece of Music Content

The following describes how the control section 20 of the audio device 1 plays back the piece of music content MC when the piece of selection content SC is switched by the user's dial operation of the selection dial 11.

For ease of explanation, the control section 20 of the audio device 1 has recognized all pieces of music content MC in order of release data: a piece of content A to a piece of content Z in that order (not shown). At first, the thumbnail image SG of the piece of content A is selected by the focus frame FC1, and the audio device 1 is playing back sound of the piece of content A.

(1-4-1) Switching a Piece of Content One Time

The following describes a case in which the control section 20 of the audio device 1 switches what the focus frame FC1 selects from the thumbnail image SG of the piece of content A to that of the piece of content B in accordance with the user's dial operation of the selection dial 11.

Figure 8:
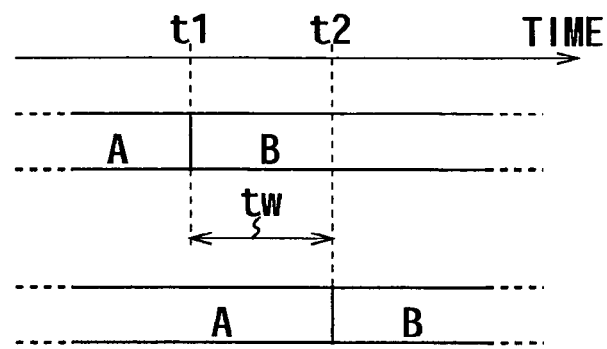
FIGS. 8A and 8B are schematic diagrams illustrating selection of content and timing of reproduction.

As shown in FIG. 8A, at time instant t1 when the control section 20 of the audio device 1 accepts the user's dial operation of the selection dial 11, the control section 20 scrolls the thumbnail images SG on the content display section 8 to recognize the piece of content B, instead of the piece of content A, as a piece of selection content SC.

At this time, as shown in FIG. 8B, the control section 20 of the audio device 1 does not start playing the piece of content B immediately. The control section 20 keeps playing the piece of content A during a waiting time tw from time instant t1 (this reason will be described later).

At time instant t2 after the waiting time tw has passed since the time instance t1, the control section 20 of the audio device 1 stops the piece of content A and then starts playing back the piece of content B.

In this manner, when the control section 20 of the audio device 1 accepts the user's dial operation of the selection dial 11, the control section 20 switches the piece of selection content SC. And then, after the waiting time tw has passed, the control section 20 starts playing the recently selected (switched) piece of selection content SC.

(1-4-2) Sequentially Switching Pieces of Content at Low Speed

The following describes a case in which the control section 20 of the audio device 1 switches the piece of selection content SC from one to another at low speed in accordance with the user's slow dial operation of the selection dial 11: from the piece of content A to the piece of content B, the piece of content C and the piece of content D in that order.

Figure 9:
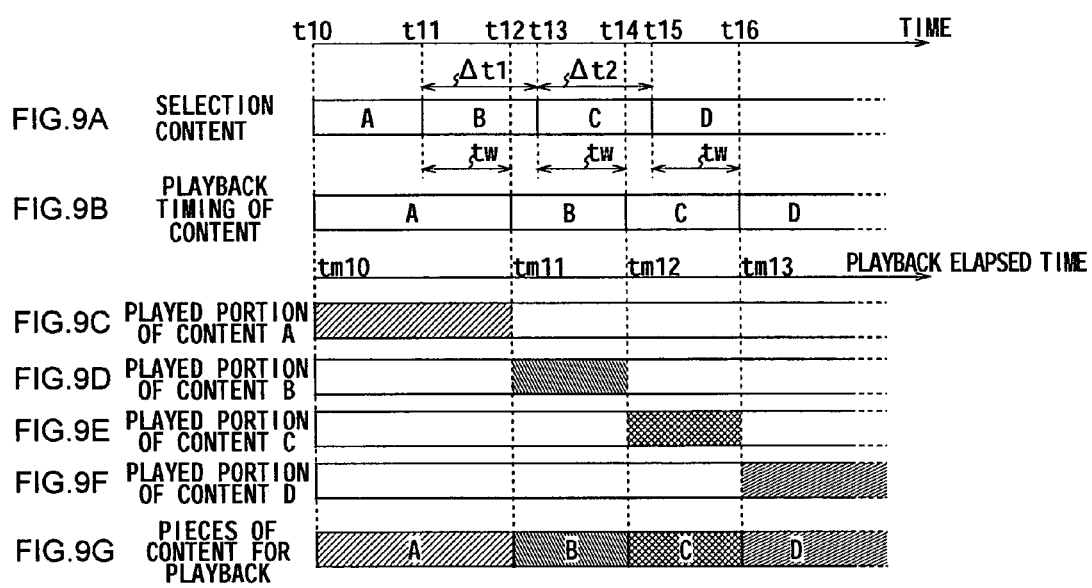
FIGS. 9A to 9G are schematic diagrams illustrating playback of content in low speed switch mode.

As shown in FIG. 9A corresponding to FIG. 8A, when the control section 20 of the audio device 1 accepts the user's first dial operation of the selection dial 11 at time instance t11, the control section 20 switches the piece of selection content SC from the piece of content A to the piece of content B.

As shown in FIG. 9B, at time instance t12 when a waiting time tw has passed since the time instance t11, the control section 20 of the audio device 1 stops the piece of content A to start playing the piece of content B.

When the control section 20 of the audio device 1 accepts the user's second dial operation of the selection dial 11 at time instance 13 when a time Δt1 (which is more than the waiting time tw) has passed since the time instance t11, the control section 20 of the audio device 1 switches the piece of selection content SC from the piece of content B to the piece of content C, as shown in FIG. 9A.

At time instance t14 when the waiting time tw has passed since the time instance t13, the control section 20 of the audio device 1 stops the piece of content B to start playing the piece of content C (FIG. 9B).

In a similar way, when the control section 20 of the audio device 1 accepts the user's third dial operation of the selection dial 11 at time instance t15 when a time Δt2 (which is more than the waiting time tw) has passed since the time instance t13, the control section 20 of the audio device 1 switches the piece of selection content SC from the piece of content C to the piece of content D, as shown in FIG. 9A.

At time instance t16 when the waiting time tw has passed since the time instance t15, the control section 20 of the audio device 1 stops the piece of content C to start playing the piece of content D (FIG. 9B).

In this manner, when the user slowly operates the selection dial 11 several times at intervals of time each of which is more than the waiting time tw, the control section 20 of the audio device 1 sequentially starts playing the pieces of selection content SC so that they follow the selection of the thumbnail images SG by the focus frame FC1 (this will be also referred to as "low speed switch mode").

(1-4-3) Sequentially Switching Pieces of Content at High Speed

The following describes a case in which the control section 20 of the audio device 1 switches what the focus frame F1 is selecting from one thumbnail images SG to another at high speed in accordance with the user's relatively high-speed dial operation of the selection dial 11: from the piece of content A to the piece of content B, the piece of content C and the piece of content D in that order.

Figure 10:
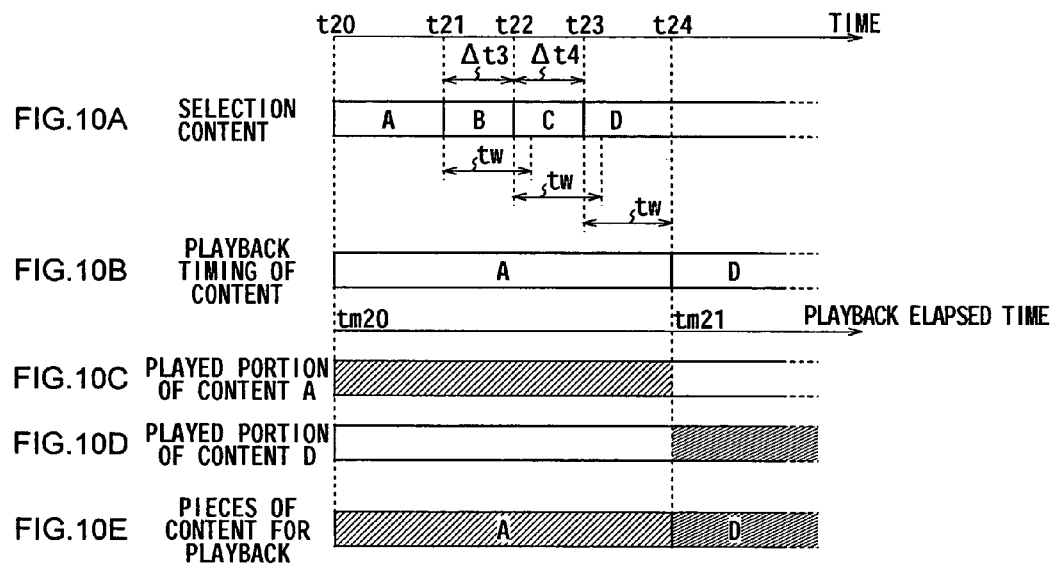
FIGS. 10A to 10E are schematic diagrams illustrating playback of content in high speed switch mode.

As shown in FIG. 10A corresponding to FIGS. 8A and 9A, when the control section 20 of the audio device 1 accepts the user's first dial operation of the selection dial 11 at time instance t21, the control section 20 switches the piece of selection content SC from the piece of content A to the piece of content B.

Assume that the control section 20 of the audio device 1 accepts the user's second dial operation of the selection dial 11 at time instance t22 when only a time Δt3 (which is less than the waiting time tw) has passed since the time instance 21 (FIG. 10A).

At this time, the control section 20 of the audio device 1 switches the piece of selection content SC from the piece of content B to the piece of content C. However, because the control section 20 accepts the second dial operation at time instance t 22 which is before the waiting time tw has passed since the time instance t21, the control section 20 determines that the user has no intention to listen to the piece of content B because he/she is sequentially performing the dial operation.

If the control section 20 of the audio device 1 starts playing the piece of content B, it may be played for a very short period of time less than the waiting time tw. This may sound like noise to the user. Accordingly, the control section 2 keeps playing the piece of content A even after the waiting time tw has passed since the time instance t21 (FIG. 10B).

The control section 20 of the audio device 1 subsequently accepts the user's third dial operation of the selection dial 11 at time instance t23 when only a time Δt4 (which is less than the waiting time tw) has passed since the time instance t22 (FIG. 10A).

At this time, the control section 20 of the audio device 1 switches the piece of selection content SC from the piece of content C to the piece of content D. However, because the control section 20 accepts the third dial operation at time instance t 23 which is before the waiting time tw has passed since the time instance t22, the control section 20 determines that the user is sequentially performing the dial operation and the piece of content C should not be played back just for a short period of time. Accordingly, the control section 20 keeps playing the piece of content A even after the waiting time tw has passed since the time instance t22 (FIG. 10B).

In a case in which the control section 20 of the audio device 1 does not accept another dial operation during the waiting time tw from the time instance t23 (FIG. 10A), the control section 20 determines that the user has stopped the dial operation at time instance t24 when the waiting time tw has passed since the time instance t23. The control section 20 then starts playing the piece of content D after stopping the piece of content A (FIG. 10B).

In this case where the user swiftly operates the selection dial 11 at short intervals, the control section 20 of the audio device 1 determines that the user has no intention to listen to the pieces of content B and C, and that he/she wants to skip the pieces of content B and C to play back the piece of content D. Accordingly, the control section 20 does not play the pieces of content B and C, and then plays back the piece of content D after the piece of content A.

In this manner, the user swiftly performs the dial operation of the selection dial 11 several times at intervals of time each of which is less than the waiting time tw, the control section 20 keeps playing, while the dial operation is being performed, the same piece of selection content SC selected before the dial operation began, and, when the dial operation is completed, stops this piece of selection content SC to play back the finally selected piece of selection content SC (this mode will be also referred to as "high speed switch mode").

By the way, the control section 20 of the audio device 1 waits for the waiting time tw after accepting the user's dial operation of the selection dial 11. This allows the control section 20 to determine whether the dial operation is relatively low-speed or high-speed. Based on the result, the control section 20 determines whether to proceed to the high speed switch mode or the low speed switch mode.

(1-4-4) Procedure of Selection Content Switch Process

Figure 11:
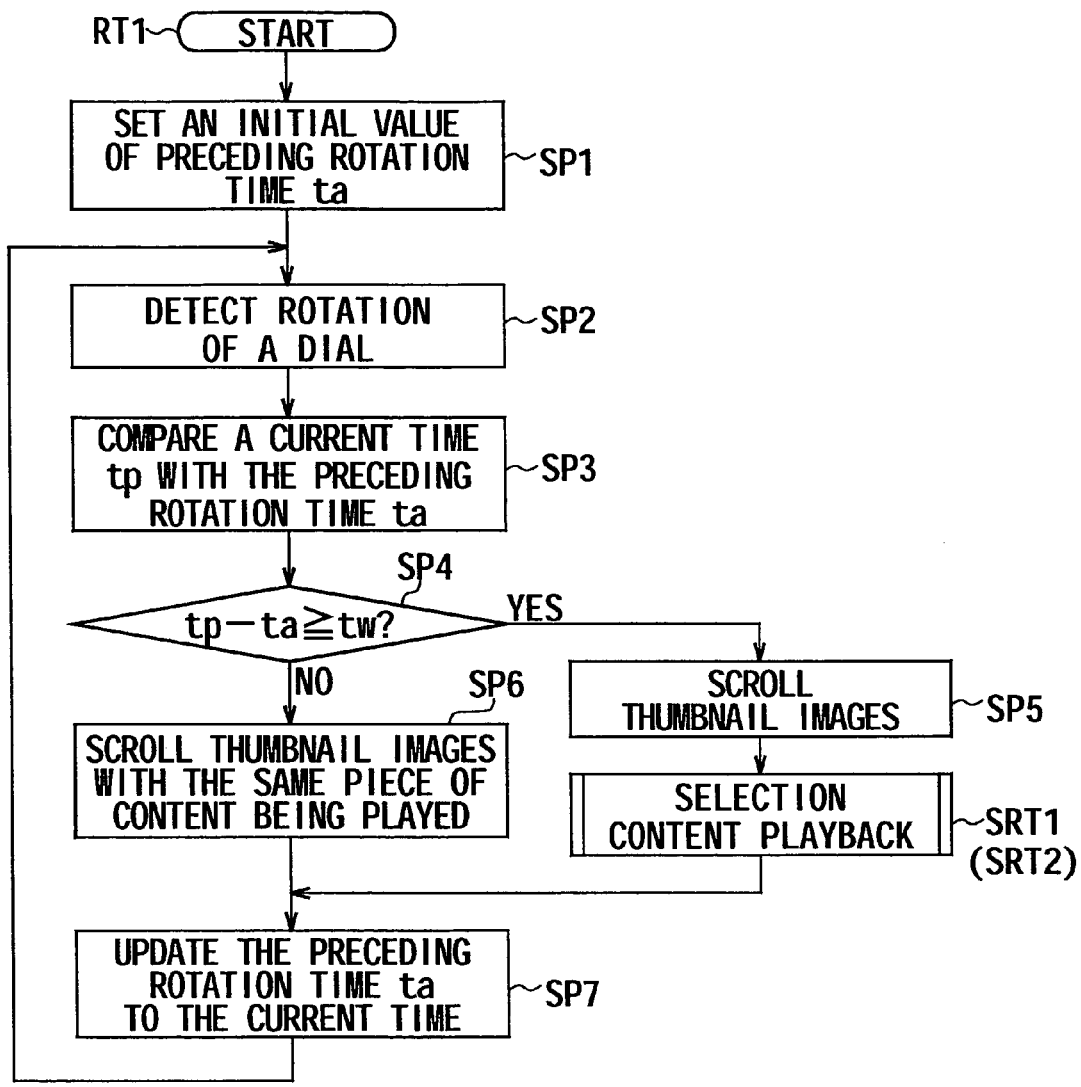
FIG. 11 is a flowchart illustrating a procedure of selection content switch process.

With reference to FIG. 11, a procedure of selection content switch process RT1 will be described. The selection content switch process is executed when the control section 20 of the audio device 1 switches the piece of selection content in response to the user's dial operation of the selection dial 11.

Actually, when the audio device 1 is powered on, the control section 20 starts the procedure of selection content switch process RT1, and then proceeds to step SP1. At step SP1, the control section 20 acquires time information from the clock circuit 32. The control section 20 sets the time information as an initial value of preceding rotation time ta which indicates a time instance just immediately after the dial operation is performed, and then proceeds to next step SP2.

At step SP2, when the user performs the dial operation of the selection dial 11, the control section 20 receives a rotation signal SR1 from the input interface 27A of the operation input section 27, and then proceeds to next step SP3.

At step SP3, the control section 20 acquires the time information from the clock circuit 32, and sets the time information as current time tp. The control section 20 compares the current time tp with the preceding rotation time ta, and then proceeds to step SP4.

At step SP4, the control section 20 checks whether a difference value of (tp−ta) is greater or equal to the waiting time tw. The affirmative result at step SP4 means that the user has performed the dial operation relatively slowly. This means that the control section 20 should proceed to the low speed switch mode. In this case, the control section 20 proceeds to next step SP5.

At step SP5, the control section 20 scrolls the thumbnail images SG on the display section 8 by one frame in a direction corresponding to the rotation direction of the selection dial. The control section 20 then plays back the piece of selection content in accordance with a procedure of selection content playback process SRT1 (described below), and proceeds to step SP7.

The negative result at step SP4 means that the user performs the dial operation at relatively high speed. This means that the control section 20 should proceed to the high speed switch mode to keep playing the currently-played piece of music content SC. In this case, the control section 20 proceeds to next step SP6.

At step SP6, in a similar way to that of step SP5, the control section 20 scrolls the thumbnail images SG on the display section 8 by one frame in a direction corresponding to the rotation direction of the selection dial. However, the control section 20 keeps playing the same piece of music content SC, and then proceeds to nest step SP7.

At step SP7, the control section 20 updates the preceding rotation time ta such that the current time tp is set as the preceding rotation time ta for next dial operation. The control section 20 subsequently returns to step SP2 to perform the series of processes.

(1-5) Playing Pieces of Content (1-5-1) Basic Principle of Playing Pieces of Content By the way, in a case in which the piece of selection content SC is switched to another in response to the user's dial operation of the selection dial 11, the control section 20 of the audio device 1 stops playing, when the dial operation is completed, the previously-selected piece of music content MC and starts playing the recently-selected piece of selection content SC.

At this time, the control section 20 of the audio device 1 does not always start from its top part when playing back the recently-selected piece of selection content SC. The control section 20 takes over the elapsed time of the previously-selected piece of selection content SC being played, or a point on a stream of the previously-selected piece of selection content SC to which the control section 20 has played (this point will be also referred to as a "playback point").

For example, as shown in FIGS. 9A and 9B, at time instance t10 when the user performs the dial operation slowly, the control section 20 of the audio device 1 starts playing the piece of content A from a point where its playback elapsed time is tm10 as shown in FIG. 9C.

When the piece of selection content SC is switched, the control section 20 of the audio device 1 stops the piece of content A at time instance t12, or at the playback elapsed time tm11 (FIG. 9C), and then starts playing the piece of content B from a point where the playback elapsed time is tm11 (FIG. 9D).

In a similar way, when the piece of selection content SC is switched, the control section 20 of the audio device 1 stops the piece of content B at time instance t14, or at the playback elapsed time tm 12 (FIG. 9D), and then starts playing the piece of content C from a point where the playback elapsed time is tm12 (FIG. 9E). When the piece of selection content SC is switched, the control section 20 of the audio device 1 stops the piece of content C at time instance t16, or at the playback elapsed time tm 13 (FIG. 9E), and then starts playing the piece of content D from a point where the playback elapsed time is tm13 (FIG. 9E).

In this manner, as shown in FIG. 9G, the control section 20 of the audio device 1 sequentially plays the part of piece of content A which is between the playback elapsed time instances of t10 and t11, the part of piece of content B which is between the playback elapsed time instances of t11 and t12, the part of piece of content C which is between the playback elapsed time instances of t12 and t13, and the part of piece of content D which is after the playback elapsed time instance t13. In this way, the control section 20 takes over the playback elapsed time when switching what it plays back.

In a case in which the user performs the dial operation at relatively high speed as shown in FIGS. 10A and 10B, the control section 20 of the audio device 1 starts playing the piece of content A at time instance t20 from a point where the playback elapsed time is tm20 (FIG. 10C). When the piece of selection content SC is sequentially switched, the control section 20 stops the piece of content A at time instance t24 at a point where the playback elapsed time is tm21 (FIG. 10C), and then starts playing the piece of content D from a point where the playback elapsed time is tm21 (FIG. 10D).

In this manner, even if the user swiftly performs the dial operation, the control section 20 of the audio device 1, as shown in FIG. 10E, sequentially plays back the part of piece of content A which is between the playback elapsed time instances of tm20 and tm21, and the part of piece of content D which is after the playback elapsed time tm21. In this way, the control section 20 takes over the playback elapsed time when switching what it plays back.

In this manner, each time the piece of selection content SC is switched, the control section 20 of the audio device 1 starts playing the piece of selection content SC from various points. This allows the user to listen to various points of the piece of selection content SC. This can be fresh and enjoyable, compared to a device that always plays back the piece of selection content SC from its top part.

By the way, when the total playing time Ts of the recently-selected piece of selection content SC is shorter than the playback elapsed time tm, the control section 20 of the audio device 1 utilizes the remainder on division of Ts (Total playing time) by tm (Playback elapsed time) as new playback elapsed time tm. In this manner, in spite of whether the total playing time Ts of the piece of selection content SC is long or short, the control section 20 can play back it from various parts.

In this manner, when the piece of selection content SC is switched by the user's dial operation of the selection dial 11, the control section 20 of the audio device 1 takes over the playback elapsed time of the previously-selected-and-played piece of music content MS, and then starts playing back the recently-selected piece of selection content SC from the same point as that of the previously-selected piece of selection content SC.

(1-5-2) Procedure of Content Playback Process

Figure 12:
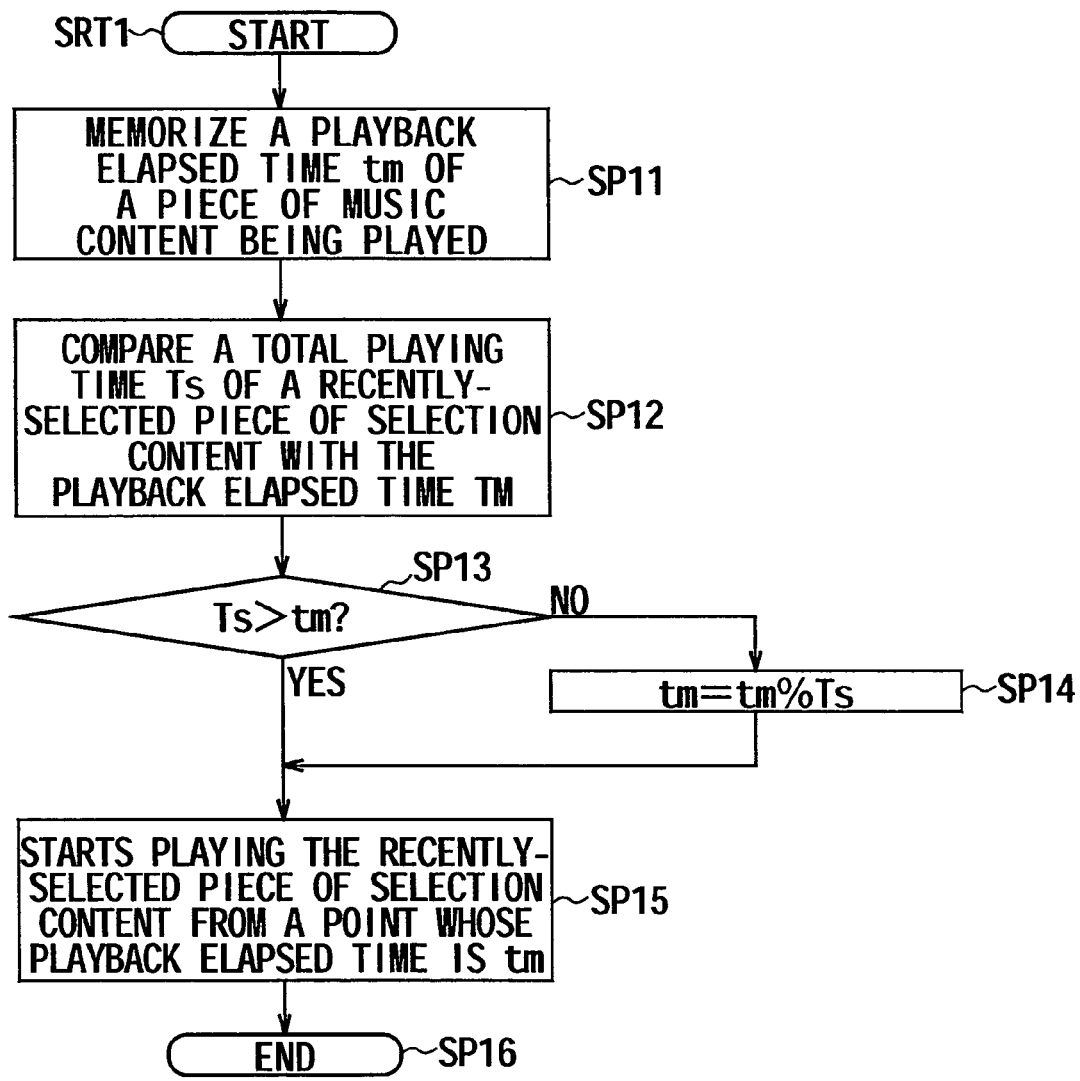
FIG. 12 is a flowchart illustrating a procedure of selection content playback process according to a first embodiment of the present invention.

With reference to FIG. 12, a procedure of selection content playback process SRT1 will be described. The selection content playback process is executed when the control section 20 of the audio device 1 plays back the newly-selected piece of selection content SC.

During the procedure of selection content switch process RT1 (FIG. 11), the control section 20 starts the procedure of selection content playback process SRT1 as subroutine, and then proceeds to step SP11. At step SP11, the control section 20 memorizes the playback elapsed time tm of the currently-played piece of selection content SC (or the previously-selected piece of selection content SC), and then proceeds to next step SP12.

At step SP12, the control section 20 compares the total playing time Ts of the newly-selected piece of selection content SC with the playback elapsed time tm, and then proceeds to next step SP13.

At step SP13, the control section 20 checks whether the total playing time Ts is longer than the playback elapsed time tm. The affirmative result at step SP13 means that the recently-selected piece of selection content SC can be played from the playback elapsed time tm. In this case, the control section 20 proceeds to next step SP15.

On the other hand, the negative result at step SP13 means that the total playback time Ts is shorter than the playback elapsed time tm. It means that the recently-selected piece of selection content SC can not be played from the playback elapsed time tm. In this case, the control section 20 proceeds to next step SP14.

At step SP14, the control section 20 sets the reminder on division of the playback elapsed time tm by the piece of selection content SC as new playback elapsed time tm, and then proceeds to next step SP15.

At step SP15, the control section 20 starts playing the recently-selected piece of selection content SC form the playback elapsed time tm, and then proceeds to next step SP16 to end the procedure of content playback process SRT1. The control section 20 subsequently returns to the procedure of selection content switch process RT1 (FIG. 11).

(1-6) Switch the Piece of Content to be Played

By the way, when the different thumbnail image SG is selected by the focus frame FC1 in response to the user's dial operation of the selection dial 11, as mentioned above, the control section 20 of the audio device 1 scrolls the thumbnail images SG on the content display section 8 to the right or left in accordance with the rotation direction of the selection dial 11.

Figure 13A:
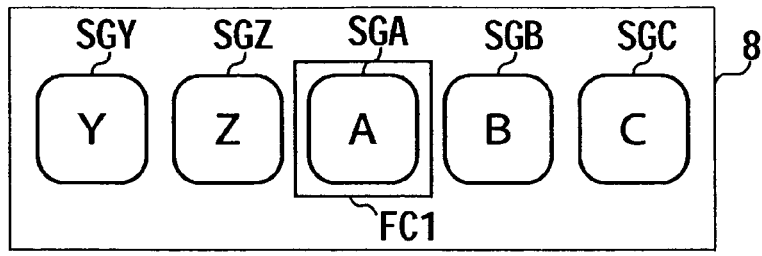
FIGS. 13A to 13E are schematic diagrams illustrating thumbnail images scrolled.

For example, when the thumbnail image SGA of the piece of content A is surrounded by the focus frame FC1 on the content display section 8 as shown in FIG. 13A (i.e. when the piece of content A is the piece of selection content SC), the control section 20 of the audio device 1 accepts the dial operation in which the user rotated the selection dial 11 at its minimum angular increment to the right to move the thumbnail images SG by one frame.

Figure 13B:
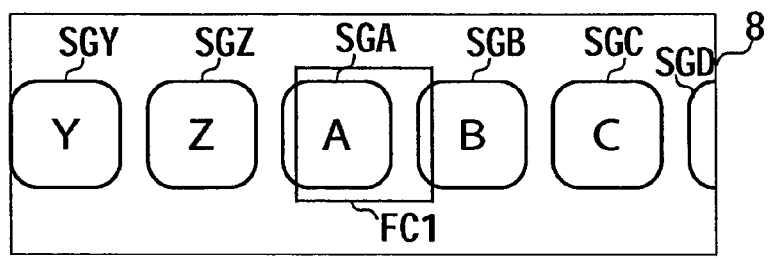
Figure 13C:
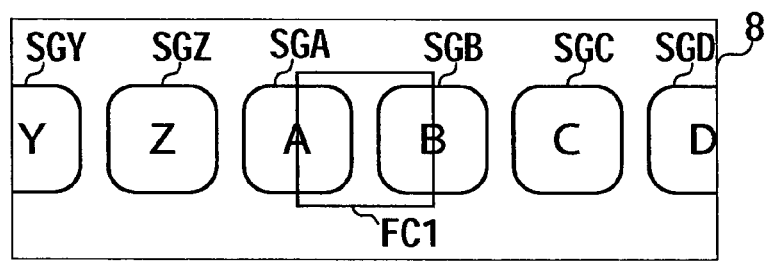
Figure 13D:
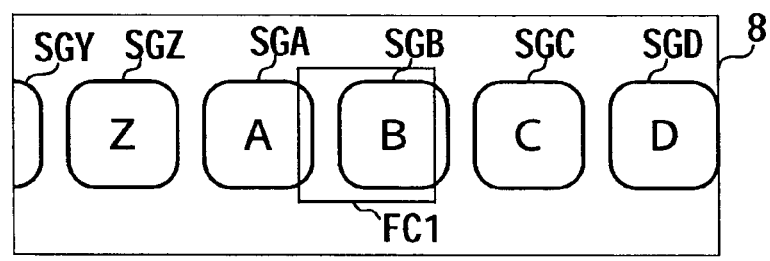
Figure 13E:
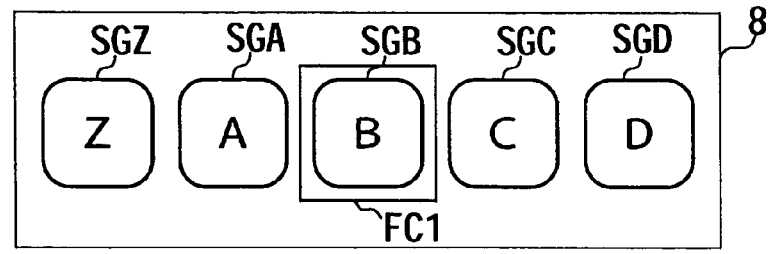

In this case, as shown in FIGS. 13B to 13D, the control section 20 of the audio device 1 keeps displaying the focus frame FC1 at the same position on the content display section 8. And then, in accordance with the dial operation, the control section 20 gradually scrolls the thumbnail images SG (SGY, SGZ, SGA, SGB and SGC) to the left to move them by one frame as shown in FIG. 13E. The control section 20 then stops this movement when the thumbnail image SGB of the piece of content B is surrounded by the focus frame FC1.

At this time, when the piece of selection content SC is switched in response to the dial operation, the control section 20 of the audio device 1 starts playing back the recently-selected piece of selection content SC. At this time, the control section 20 gradually turns down the volume of the previously-selected piece of selection content SC (fade-out), while the control section 20 gradually turns up the volume of the recently-selected piece of selection content SC (fade-in).

Figure 14A:
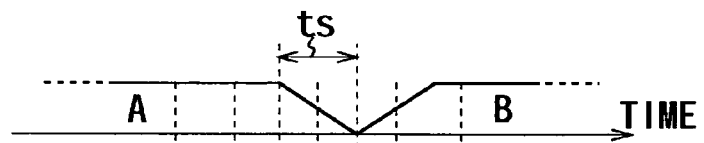
FIGS. 14A and 14B are schematic diagrams illustrating playback volume levels during a process of switching the pieces of content.
Figure 14B:
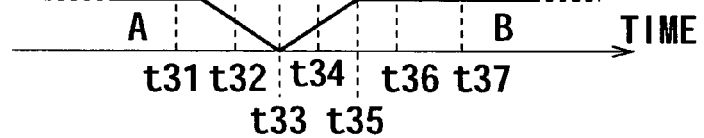

Actually, the control section 20 of the audio device 1, as shown in FIGS. 14A and 14B, performs fade-out process to gradually turn down the playback volume level of the piece of content A at both left and right channels from a usual level to zero. In addition, the control section 20 performs fade-in process to gradually turn up the playback volume level of the piece of content B from zero to a usual level.

In addition to that, the control section 20 of the audio device 1 controls the volumes of the left and right channels separately. The control section 20 performs fade-in and fade-out processes on the left and right channels at different timings. The playback volume level of the right channel changes earlier than that of the left channel by ts (Timing difference).

As shown in FIGS. 14A and 14B, at time instance t31, the control section 20 of the audio device 1 controls the left and right channels so that their playback volume levels become almost the same as for the piece of content A (FIG. 15A). This gives the user a feeling that the sound image of the piece of content A exists on almost the center (FIG. 15B).

At time instance t32, the control section 20 of the audio device 1 much more turns down the playback volume level of the right channel than that of the left channel (FIG. 16A). This gives the user a feeling that the sound image of the piece of content A exists on the left side as shown in FIG. 16B.

After that, at the time instance t33 or the around, the control section 20 of the audio device 1 gradually turns down the playback volume level of the piece of content A on the left channel from a usual volume level, and also turns down the playback volume level of the piece of content A on the right channel to zero. In addition, the control section 20 gradually turns up the playback volume level of the piece of content B from zero level.

At time instance t34, as shown in FIG. 17A, the control section 20 of the audio device 1 outputs the sound of the piece of content A on the left channel at approximately middle playback volume level and the sound of the piece of content B on the right channel at approximately middle playback volume level. This gives the user a feeling that as shown in FIG. 16B, the sound image of the piece of content A exists on the left side and the sound image of the piece of content B exists on the right side.

At time instance t35, the control section 20 of the audio device 1 turns down the playback volume level of the piece of content A on the left channel to zero and then gradually increases the playback volume level of the piece of content B on the left channel from zero level. In addition, the control section 20 gradually turns up the playback volume level of the piece of content B on the right channel to a usual volume level.

Figure 18A:
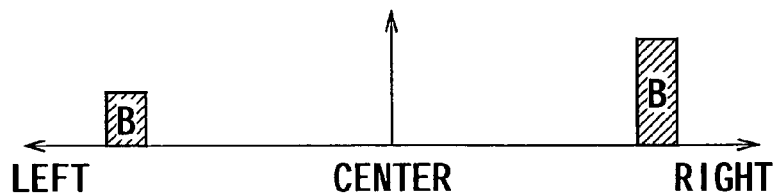
FIGS. 18A and 18B are schematic diagrams illustrating volume levels and sound localization at time instance t36.
Figure 18B:
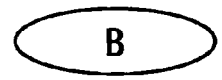

At time instance t36, the control section 20 of the audio device 1, as shown in FIG. 18A, outputs the sound of the piece of content B on the left channel at approximately middle playback volume level, and also outputs the sound of the piece of content B on the right channel at the usual volume level. That gives the user a feeling that the sound image of the piece of content B exists on the right side as shown in FIG. 18B.

Figure 19A:
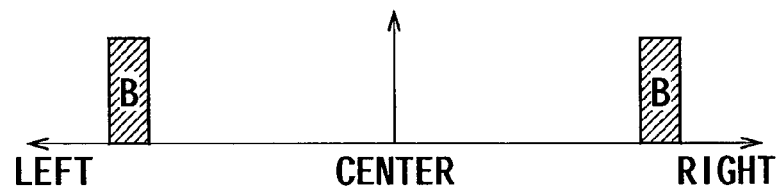
FIGS. 19A and 19B are schematic diagrams illustrating volume levels and sound localization at time instance t37.
Figure 19B:
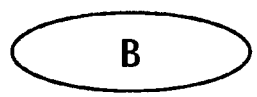

At time instance t37, as shown in FIG. 19A, to make the volumes of the piece of content B on the left and right channels almost the same, the control section 20 of the audio device 1 gives the user a feeling that the sound image of the piece of content B exists on almost the center as shown in FIG. 19B.

In this manner, as shown in FIGS. 14A and 14B, the control section 20 of the audio device 1 separately controls the volume levels of the left and right channels such that the volume level associated with the upstream-side (or right-side) thumbnail images SG being scrolled changes ts (ts: Timing difference) earlier than the other. Accordingly, as shown in FIGS. 15B to 19B, that gives the user the following feeling: the sound of the piece of content A is faded out and its sound image gradually moves from the center from the left, while the sound of the piece of content B is faded in and its sound image gradually moves to the center from the right.

Accordingly, when what the focus frame FC1 selects is switched from one thumbnail image SG to another in accordance with the user's dial operation of the selection dial 11 to the right, the control section 20 of the audio device 1 can give the user the following feeling: the sound images of the previously-selected and recently-selected pieces of selection content SC flow from the right to left in association with the movement of the thumbnail image SG (the thumbnail image SGA which is associated with the previously-selected piece of selection content tC, in this case) going out of the focus frame FC1 to the left and another thumbnail image SG (the thumbnail image SGB which is associated with the recently-selected piece of selection content SC, in this case) going into the focus frame FC1 from the right.

By the way, when the control section 20 of the audio device 1 accepts the user's dial operation of the selection dial 11 which is rotated to the left, the control section 20 scrolls the thumbnail images SG from the left to the right. In addition, the control section 20 controls the left- and right-sides volume levels in left-right reverse manner from the above method illustrated by FIGS. 14 to 19. This gives the user a feeling that the sound images of the previously- and recently-selected pieces of selection content SC flow from the left to the right.

In this manner, the control section 20 of the audio device 1 scrolls, in accordance with the user's dial operation of the selection dial 11, the thumbnail images SG on the content display section 8 to the right or the left, and controls the left- and right-sides volume levels such that the one is faded in or out ts (ts: Timing difference) earlier than the other. That gives the user a feeling that the sound images of the previously- and recently-selected pieces of selection content SC flow to the left or the right in accordance with the movement of the thumbnail images SG.

(1-7) Operation and Effect

With the audio device 1 with the above configuration, when the user performs the dial operation of the selection dial 11, the control section 20 of the audio device 1 switches the piece of selection content SC to another one, and then plays back the newly-selected piece of selection content SC.

In this case, the control section 20 of the audio device 1 recognizes the playback elapsed time tm of the previously-selected piece of selection content SC such that the newly-selected piece of selection content SC takes over this playback elapsed time tm. This means that the control section 20 starts playing back the newly-selected piece of selection content SC from a part whose playback elapsed time is tm, not from its top part.

Accordingly, the control section 20 of the audio device 1 can play back the piece of selection content SC from various points (i.e. various points of playback elapsed time tm). This allows the user to start listening to the pieces of selection content SC from various points. This can be fresh and enjoyable, compared to a device that always starts playing back the pieces of selection content SC from their top parts.

FIG. 20 (the parts of FIG. 20 have been designated by the same symbols and marks as the corresponding parts of FIG. 9) illustrates a case where the user, for example, switches in the following manner by performing the dial operation; the piece of content A to the piece of content B, the piece of content C, the piece of content B, the piece of content C, and the piece of content D in that order.

In this case, when the control section 20 of the audio device 1 plays back the piece of content B second time, the control section 20 plays back it from a point whose playback elapsed time is tm33 that is after a time Δt6 has passed since the playback elapsed time t32: the playback elapsed time tm32 is a time instance when the first playback of the piece of content B is completed; and the time Δt6 is a period of time when the piece of content C is being played back.

Accordingly, the control section 20 of the audio device 1 can give the user a feeling that he/she is selecting, while the audio device 1 is playing back the pieces of content B, C, and the like, one of them to listen to. In other words, the control section 20 of the audio device 1 can give the user a feeling that he/she is selecting, while the audio device 1 is simultaneously playing back a plurality of pieces of music content SC, one of them by listening and checking them.

In addition, the control section 20 of the audio device 1 has recognized the pieces of music content SC in order of release date. Therefore, user's dial operation switches the piece of music content SC to another one that caught on during almost the same era. Especially, the audio device 1 plays back, when accepting the user's continuous dial operation, the pieces of music content SC that caught on during a certain era one after another from various parts. This gives the user a feeling like he/she is listening to radio stations in the past, and changing their channels.

Moreover, if the total playing time Ts of the newly-selected piece of selection content SC is less than the playback elapsed time tm of the previously-selected piece of selection content SC, the control section 20 of the audio device 1 sets the remainder on division of Ts (Total playing time) by tm (Playback elapsed time) as new playback elapsed time tm. This prevents the audio device 1 from being silent suddenly due to the shorter total playing time Ts of the newly-selected piece of selection content SC, for example. That allows the audio device 1 to play back the pieces of music content MS from various points, in spite of the total playing time Ts of the newly- and previously-selected pieces of selection content SC.

Furthermore, the control section 20 of the audio device 1 controls, when the piece of music content MC to be played is switched, the playback volume level to perform fade-out and fade-in. This prevents radical changes in volume, and prevents the user from feeling discomfort.

Furthermore, the control section 20 of the audio device 1 performs fade-in and fade-out on the left and right channels such that the one is ts (ts: Timing difference) earlier than the other. This gives the user a feeling that the sound images change according to the thumbnail images SG scrolled. This entertains the user.

The above configuration makes this possible: the control section 20 of the audio device 1 according to the first embodiment of the present invention recognizes, when switching the piece of selection content SC to play back it in response to the user's dial operation of the selection dial 11, the playback elapsed time tm of the previously-selected piece of selection content SC such that the newly-selected piece of selection content SC takes over this playback elapsed time tm. The control section 20 therefore starts playing back the newly- (or recently-)selected piece of selection content SC from a point whose playback elapsed time is tm, not from its top point. In this manner, the control section 20 starts playing back the pieces of selection content SC from various points, or various points of playback elapsed time tm. This allows the user to listen to the pieces of selection content SC from various points.

(2) Second Embodiment (2-1) Configuration of Audio Device

The configuration of an audio device 50 according to a second embodiment is almost the same as the audio device 1 illustrated by FIGS. 1 to 4. Accordingly, the description thereof is omitted. By the way, a control section 51, which corresponds to the control section 20 in the first embodiment, takes overall control of the audio device 50.

In the same way as the audio device 1, the audio device 50 includes the front panel 7 illustrated by FIGS. 5 to 7. The audio device 50 displays the thumbnail images SG of the pieces of music content MC on the content display section 8.

Actually, the audio device 50 according to the second embodiment of the present invention plays back the pieces of music content MC in a different way from that of the audio device 1 of the first embodiment. This point will be described below.

(2-2) Playback of Content (2-2-1) Basic Principle of Playing the Pieces of Content In the similar way to that of the control section 20 of the audio device 1 of the first embodiment, the control section 51 of the audio device 50 according to the second embodiment stops, when the user performs the dial operation of the selection dial 11 to switch the piece of selection content SC, the currently-played piece of music content MS (i.e. the previously-selected piece of selection content SC) after the dial operation is completed, and then starts playing back the newly-selected piece of selection content SC.

In this case, the control section 51 of the audio device 50 does not start the newly-selected piece of selection content SC from its top part, like that of the first embodiment. However, the control section 51 of the second embodiment recognizes a ratio of the playback elapsed time tm of the previously-selected piece of selection content SC to its total playing time Ts as an elapse ratio pr such that the newly-selected piece of selection content SC will take over it.

For example, as shown in FIG. 21A, the following describes a case in which the user's dial operation of the selection dial 11 switches the piece of selection content SC from the piece of content A to the piece of content B on the audio device 50 at time instance tm41 during the playback of the piece of content A.

In this case, the control section 51 of the audio device 50, as shown in FIGS. 21A and 21B, calculates the elapse ratio pr of the playback elapsed time tm41 of the piece of content A to its total playing time Ts42.

The control section 51 then, as shown in FIGS. 21C and 21D, calculates a playback elapsed time tm51 corresponding to the elapse ratio pr for the piece of content B. The control section 51 subsequently, as shown in FIG. 21E, stops the currently-played piece of content A at a point whose playback elapsed time is tm41, and then starts playing back the piece of content B from a part whose playback elapsed time is tm51.

When the playing time of the piece of content B (which corresponds to the difference between the total playing time Ts of the piece of content B and its playback elapsed time tm51) is less than a predetermined threshold TH, the control section 51 starts playing back the piece of content B from its top part (whose playback elapsed time is designated by "tm50"), not from the part whose playback elapsed time is tm51. This prevents the control section 51 from starting the piece of content B from its later part that may not be interesting to the user.

In this manner, the control section 51 of the audio device 50 calculates the elapse ratio pr based on the playback elapsed time tm and total playing time Ts of the previously-selected piece of selection content SC. The control section 51 then plays back the newly-selected piece of selection content from a point corresponding to the elapse ratio pr. In this manner, the newly-selected piece of selection content SC takes over the elapse ratio pr from the previously-selected piece of selection content SC.

(2-2-2) Procedure of Content Playback Process

Figure 22:
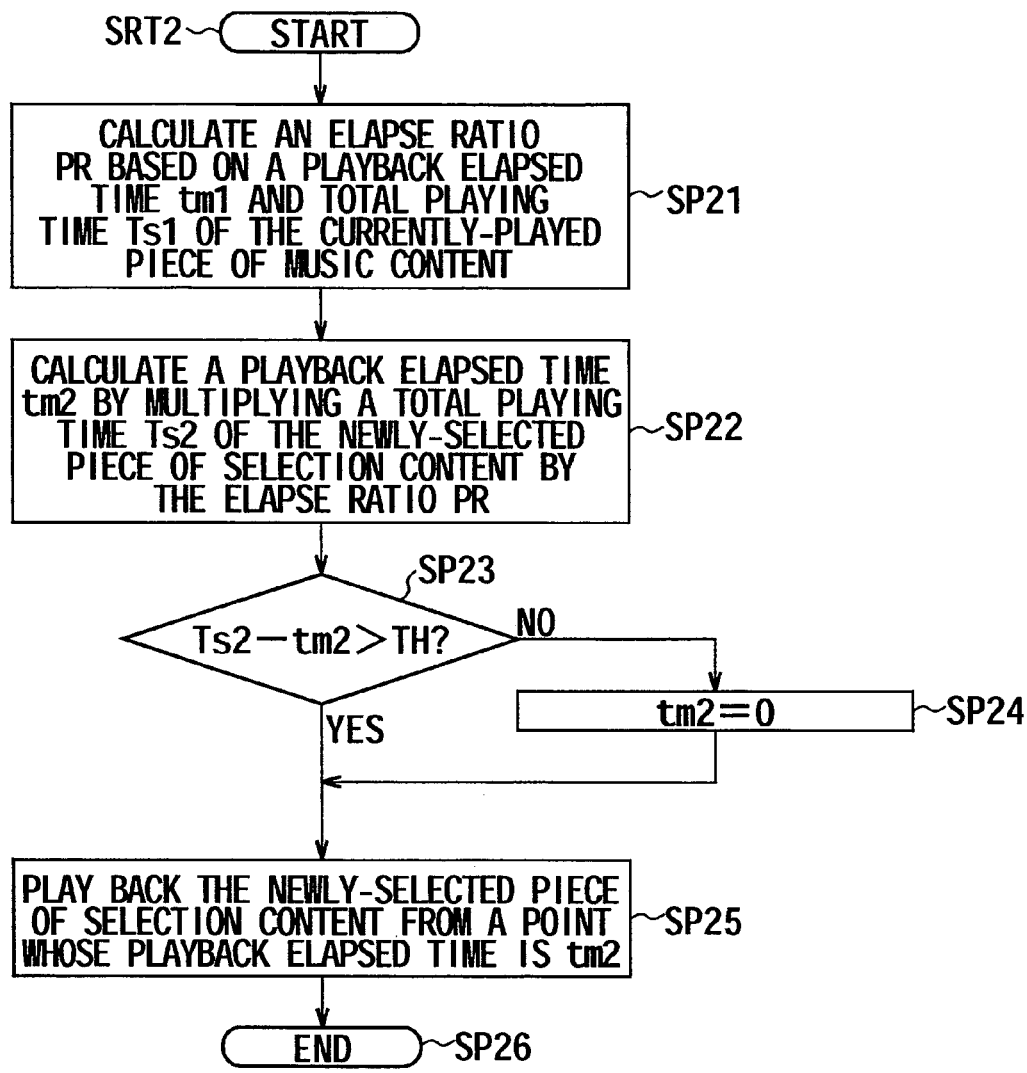
FIG. 22 is a flowchart illustrating a procedure of selection content playback process according to a second embodiment of the present invention.

With reference to FIG. 22, a procedure of selection content playback process SRT2 will be described. The selection content playback process is executed when the control section 51 of the audio device 50 plays back the newly-selected piece of selection content SC.

In the similar way to that of the procedure of the selection content switch process RT1 of the first embodiment (FIG. 11), the control section 51 starts, while performing the procedure of the selection content switch process RT1 (FIG. 11), the procedure of selection content playback process SRT2 as subroutine, and then proceeds to step SP21. At step SP21, the control section 51 divides tm1 (tm1: Playback elapsed time of the currently-played, or previously-selected, piece of selection content SC) by Ts (Ts: Total playing time) to obtain the elapse ratio pr. The control section 51 subsequently proceeds to next step SP22.

At step SP22, the control section 51 multiplies Ts2 (Ts2: Total playing time of the newly-selected piece of selection content SC) by pr (pr: Elapse ratio) to obtain the playback elapsed time tm2 of the newly-selected piece of selection content SC which corresponds to the elapse ratio pr. The control section 51 subsequently proceeds to next step SP23.

At step SP23, the control section 51 checks whether the difference between the total playing time Ts of the newly-selected piece of selection content SC and its playback elapsed time tm2 is greater than the threshold TH. The affirmative result at step SP23 means that the playing time of the newly-selected piece of selection content SC is sufficiently long. In this case, the control section 51 proceeds to next step SP25.

On the other hand, the negative result at step SP23 means that the playing time of the newly-selected piece of selection content SC is very short. It means that there is possibility that the control section 51 will only play back the later part of the newly-selected piece of selection content SC. In this case, the control section 51 proceeds to next step SP24.

At step SP24, the control section 51 sets the playback elapsed time tm2 up as zero to start playing back the newly-selected piece of selection content SC from its top part, and then proceeds to next step SP25.

At step SP25, the control section 51 starts playing back the newly-selected piece of selection content SC from a point whose playback elapsed time is tm2, and then proceeds to next step SP26 to end the procedure of content playback process SRT2. The control section 51 subsequently returns to the procedure of selection content switch process RT1 (FIG. 11).

(2-3) Operation and Effect

With the audio device 50 with the above configuration, when the user performs the dial operation of the selection dial 11, the control section 51 of the audio device 50 according to the second embodiment of the present invention switches the piece of selection content SC to another one, and then plays back the newly-selected piece of selection content SC, in the similar way to that of the audio device 1 of the first embodiment.

In this case, the control section 51 of the audio device 50 obtains the elapse ratio pr of the previously-selected piece of selection content SC such that the newly-selected piece of selection content SC takes over this elapse ratio pr. This means that the control section 20 starts playing back the newly-selected piece of selection content SC from a part whose playback elapsed time is tm that corresponds to the elapse ratio pr, not from its top part.

Accordingly, like the audio device 1 of the first embodiment, the control section 51 of the audio device 50 can play back the piece of selection content SC from various points. This allows the user to start listening to the pieces of selection content SC from various points. This can be fresh and enjoyable, compared to a device that always starts playing back the pieces of selection content SC from their top parts.

If the playing time of the newly-selected piece of selection content SC is shorter than the predetermined threshold TH, the control section 51 starts playing back the newly-selected piece of selection content SC from its top part, not from a point whose playback elapsed time is tm that corresponds to the elapse ratio pr. This prevents the control section 51 from playing back only the later part of the newly-selected piece of selection content SC that may not be interesting to the user.

The above configuration makes this possible: the control section 51 of the audio device 50 according to the second embodiment of the present invention recognizes, when switching the piece of selection content SC to play back it in response to the user's dial operation of the selection dial 11, the elapse ratio pr of the previously-selected piece of selection content SC such that the newly-selected piece of selection content SC takes over this elapse ratio pr. The control section 51 therefore starts playing back the newly- (or recently-)selected piece of selection content SC from a point whose playback elapsed time is tm that corresponds to the elapse ratio pr, not from its top point. In this manner, the control section 51 starts playing back the pieces of selection content SC from various points, or various points of playback elapsed time tm. This allows the user to listen to the pieces of selection content SC from various points.

(3) Other Embodiments

In the above-noted embodiment, the audio device 1 or 50 recognizes playback elapse state of the previously-selected piece of selection content SC, such as the playback elapsed time tm or the elapse ratio pr, such that the newly-selected piece of selection content SC takes over it. However the present invention is not limited to this. The newly-selected piece of selection content SC may take over various playback elapse state. For example, each piece of music content MC may have been previously divided into some parts, such as "Intro", "A-Melody", "B-Melody", "Climax" and "Ending", and the audio device 1 or 50 may recognize the part of the previously-selected piece of selection content SC, to which the audio device 1 or 50 has played back, such that the newly-selected piece of selection content SC takes over it. In this case, the newly-selected piece of selection content SC will be played back from a point corresponding to the recognized part.

In addition, in the above-noted first embodiment, if the total playing time Ts of the newly-selected piece of selection content SC is shorter than the playback elapsed time tm of the previously-selected piece of selection content SC, the audio device 1 utilizes the remainder on division of Ts (Ts: Total playing time) by tm (tm: Playback elapsed time) as new playback elapsed time tm. However the present invention is not limited to this. For example, if the total playing time Ts of the newly-selected piece of selection content SC is shorter than the playback elapsed time tm of the previously-selected piece of selection content SC, the audio device 1 may set the new playback elapsed time tm up as zero (i.e. the top part). Alternatively, the audio device 1 may set the new playback elapsed time tm randomly within a range of the total playing time Ts of the newly-selected piece of selection content SC.

Furthermore, in the above-noted second embodiment, if the playing time of the newly-selected piece of selection content SC is shorter than the predetermined threshold TH, the audio device 50 starts playing back the newly-selected piece of selection content SC from its top part, not from a point whose playback elapsed time is tm that corresponds to the elapse ratio pr. However the present invention is not limited to this. The audio device 50 may always utilize the elapse ratio pr regardless of the length of the playing time of the newly-selected piece of selection content SC, for example. Alternatively, the user may set the audio device 50 on whether to utilize the elapse ratio pr or not.

Furthermore, in the above-noted embodiment, when the piece of music content MC to be played is switched to another, the audio device 1 or 50 gets the previously-selected piece of music content MC faded out, and gets the recently-selected piece of music content MC faded in. However the present invention is not limited to this. The audio device 1 may perform cross-fade, or put the part of the previously-selected piece of music content MC to be faded out on the part of the recently-selected piece of music content MC to be faded in. Alternatively, the audio device 1 or 50 may perform either fade-out or fade-in.

Furthermore, in the above-noted embodiment, the audio device 1 or 50 controls the playback volume levels of the pieces of music content MC on both the left and right channels to give the user a feeling that the sound images of the pieces of music content MC changes according to the thumbnail images SG scrolled. However the present invention is not limited to this. For example, the audio device 1 or 50 may control the playback volume levels of the pieces of music content MC on both the left and right channels to give the user a feeling that the sound images of the pieces of music content MC changes separately from the thumbnail images SG scrolled. Alternatively, the audio device 1 or 50 may make the playback volume levels of the pieces of music content MC on both the left and right channels almost the same so that the sound images exist on almost the center. Alternatively, the audio device 1 or 50 may control the phase of the pieces of music content MC on both the left and right channels to change the sound images.

Furthermore, in the above-noted embodiments, rotating the selection dial 11 switches the piece of selection content SC. However the present invention is not limited to this. For example, pushing selection buttons, such as the operation buttons 9, may switch the piece of selection content SC. Alternatively, putting and moving a finger on a touch panel on the audio device 1 may switch the piece of selection content SC.

Furthermore, in the above-noted embodiments, the audio device 1, where the piece of music content MC to be played is switched in accordance with the user's operation instruction, is applied. However the present invention is not limited to this. For example, a video recorder, where the pieces of video content are stored in a Hard Disk Drive and the piece of video content to be played is switched in accordance with the user's operation instructions, may be applied.

Furthermore, in the above-noted embodiments, the audio device 1 with hardware components is applied. However the present invention is not limited to this. Electronic devices, such as personal computers and mobile phones capable of playing back music and displaying information, may perform a content playback program and other programs to switch what it plays back from one piece of music content MC to another in accordance with the user's operation instructions. In this case, the user may operate keys or a mouse to switch the piece of music content MC to be played.

In addition, as a storage medium for storing the content playback program and other programs, the following media may be applied to: the ROM 20B of the control section 20, the Hard Disk Drive 22, an external storage media such as the optical disc 4 and the small memory card 6. The programs in the external storage media may be installed on the Hard Disk Drive 22. The audio device 1 may acquire the content playback program and other programs from outside through a communication cable (such as Universal Serial Bus (USB) cable and "Ethernet®"), or a wireless Local Area Network (LAN) (such as IEEE 802.11a/b/g (IEEE: Institute of Electrical and Electronics Engineers)).

Furthermore, in the above-noted embodiment, the audio device 1, which is equivalent to the music content playback apparatus, includes: the operation input section 27 and the reproduction control section 20D, which are equivalent to selection means; the reproduction control section 20D, which is recognition means; and the audio reproduction section 28, which is equivalent to playback means. However the present invention is not limited to this. The music content playback apparatus may include other components which are equivalent to the selection means, the recognition means and the playback means.

The music content playback apparatus, music content playback method and storage medium according to an embodiment of the present invention may be also applied to various content playback devices capable of selecting and playing a desired piece of music content out of a plurality of pieces of music content.

It should be understood by those skilled in the art that various modifications, combinations, sub-combinations and alterations may occur depending on design requirements and other factors insofar as they are within the scope of the appended claims or the equivalents thereof.

What is claimed is:

1. A music content playback apparatus comprising:
   selection means for selecting a piece of music content out of a plurality of pieces of music content;
   recognition means for recognizing playback elapse state about a previous piece of music content played immediately before said piece of music content is selected; and
   playback means for playing back said piece of music content from a playback point corresponding to said playback elapse state.

2. The music content playback apparatus according to claim 1, wherein:
   said recognition means recognizes playback elapsed time of said previous piece of music content; and
   said playback means plays back said piece of music content from a playback point corresponding to said playback elapsed time.

3. The music content playback apparatus according to claim 2, wherein
   if total playing time of said selected piece of music content is shorter than said playback elapsed time of said previous piece of music content, said playback means recognizes a remainder on division of said playback elapsed time by the total playing time of said selected piece of music content as new playback elapsed time and then plays back said selected piece of music content from a playback point corresponding to said new playback elapsed time.

4. The music content playback apparatus according to claim 1, wherein:
   said recognition means recognizes, as for said previous piece of music content, an elapse ratio of playback elapsed time to total playing time; and
   said playback means plays back said selected piece of music content from a playback point corresponding to said elapse ratio.

5. The music content playback apparatus according to claim 4, wherein
   if playing time of said piece of music content left after the point corresponding to said elapse ratio is less or equal to a predetermined threshold, said playback means plays back said piece of music content from a top part.

6. A music content playback method comprising:
   selecting a piece of music content out of a plurality of pieces of music content;
   recognizing playback elapse state about a previous piece of music content played immediately before said piece of music content is selected; and
   playing back said piece of music content from a playback point corresponding to said playback elapse state.

7. A storage medium for storing a music content playback program for causing a music content playback apparatus to execute:
   selecting a piece of music content out of a plurality of pieces of music content;
   recognizing playback elapse state about a previous piece of music content played immediately before said piece of music content is selected; and
   playing back said piece of music content from a playback point corresponding to said playback elapse state.

8. A music content playback apparatus comprising:
   a selection section that selects a piece of music content out of a plurality of pieces of music content;
   a recognition section that recognizes playback elapse state about a previous piece of music content played immediately before said piece of music content is selected; and
   a playback section that plays back said piece of music content from a playback point corresponding to said playback elapse state.

* * * * *